United States Patent
Vijayakumar et al.

(10) Patent No.: US 8,190,834 B2
(45) Date of Patent: May 29, 2012

(54) PROCESS FOR CONTIGUOUSLY STREAMING DATA FROM A CONTENT ADDRESSED STORAGE SYSTEM

(75) Inventors: Bala Vijayakumar, San Jose, CA (US); Suman Tokuri, Bangalore (IN); Ramachandran Srinivasan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 300 days.

(21) Appl. No.: 11/818,577

(22) Filed: Jun. 15, 2007

(65) Prior Publication Data

US 2008/0313385 A1   Dec. 18, 2008

(51) Int. Cl.
*G06F 13/00* (2006.01)

(52) U.S. Cl. ...... 711/162; 711/4; 711/108; 711/E12.103

(58) Field of Classification Search .............. 711/4, 111, 711/118, 135, 161, 162, 165, 171; 360/77.12; 365/221; 375/354; 710/55, 56, 65, 66, 162
See application file for complete search history.

(56) References Cited

U.S. PATENT DOCUMENTS

| | | | | |
|---|---|---|---|---|
| 5,706,467 A * | 1/1998 | Vishlitzky et al. | ............ | 711/129 |
| 6,718,410 B2 * | 4/2004 | Slater | .............................. | 710/66 |
| 6,779,057 B2 * | 8/2004 | Masters et al. | .................. | 710/55 |
| 6,851,011 B2 * | 2/2005 | Lin | .................... | 711/4 |
| 7,003,619 B1 * | 2/2006 | Moore et al. | .................... | 711/102 |
| 7,116,736 B2 * | 10/2006 | Blaum et al. | ................... | 375/354 |
| 7,350,041 B1 * | 3/2008 | Armangau et al. | ........... | 711/162 |
| 7,565,493 B1 * | 7/2009 | Todd et al. | .................... | 711/137 |
| 7,590,807 B2 * | 9/2009 | McGovern et al. | ........... | 711/159 |
| 2003/0001036 A1 * | 1/2003 | Beavers et al. | ............. | 242/334.5 |
| 2003/0206475 A1 * | 11/2003 | Duh et al. | ...................... | 365/221 |
| 2004/0078508 A1 * | 4/2004 | Rivard | ............... | 711/4 |
| 2004/0215872 A1 * | 10/2004 | Dawson et al. | ............... | 711/111 |
| 2005/0041317 A1 * | 2/2005 | Jaquette | ......................... | 360/46 |
| 2006/0002002 A1 * | 1/2006 | Jaquette | ..................... | 360/77.12 |
| 2007/0186036 A1 * | 8/2007 | Bittner, Jr. | .................... | 711/108 |
| 2008/0244196 A1 * | 10/2008 | Shitomi et al. | ................ | 711/147 |

* cited by examiner

*Primary Examiner* — Edward Dudek, Jr.
*Assistant Examiner* — Sean D Rossiter
(74) *Attorney, Agent, or Firm* — Dergosits & Noah LLP; Todd A. Noah (57) ABSTRACT

What is disclosed is process for backing data objects from a content addressed storage system to a tape storage device such that the data objects are written in a contiguous sequential fashion. Data objects are kept together on the storage medium, rather than fragmented. An embodiment of the present invention describes the software modules and memory buffers required to implement this process. Additionally, what is disclosed is a process that restores data objects that have been contiguously written to tape. According to one embodiment of the present invention, recovery of non-fragmented data objects is made more efficient and less prone to failure.

16 Claims, 7 Drawing Sheets

PROCESS FOR CONTIGUOUSLY STREAMING DATA FROM A CONTENT ADDRESSED STORAGE SYSTEM

TECHNICAL FIELD

The present invention relates generally to the backup, storage and retrieval of file systems, and specifically, to a process, system and computer program product for contiguously streaming data objects from a content addressed storage system such that data objects are not fragmented when written to the storage medium.

BACKGROUND OF THE INVENTION

Organizations and businesses that need to retain data assets for prolonged periods of time have migrated from traditional location-based file storage systems to more efficient content addressed storage (CAS) systems. CAS systems keep data objects (also termed files, binary large objects, or blobs) in a single flat directory, rather than the tiered directory used by traditional location-based file systems. Additionally, CAS systems rename data objects and do not refer to them by user-provided file names. Instead, the system creates names for stored data objects based upon their content and context. Any file name provided by the user is stored as metadata associated with the data object, along with other information, such as the data object's date of creation, creator name, date of last modification, project name, location in the CAS system repository, etc. Data objects are recovered from a CAS system repository by referring to identifiers that the system associates with the requested data object. To interact with a CAS system and its associated repository, a user may use a backup utility software application, also known as a data mover agent (DMA). Instructions to initiate backup to, archive from, and recover and archived data object from a CAS repository can be executed using a DMA.

To further protect valuable data assets, an organization may utilize a secondary backup or archive of the primary CAS system. Secondary backup devices, such as magnetic or optical tape drives, may be used to mirror data objects stored on the primary CAS system. The secondary storage system may be connected to the primary CAS system over a network, with appropriate hardware and software mechanisms for enabling backup, recovery and archive.

One method for archiving content addressed data objects to a secondary storage device involves identifying those data objects for archiving, then issuing an appropriate computer instruction or command to the backup utility software application. The current protocol standard in the industry is the open Network Data Management Protocol (NDMP). Commands issued to the backup and recovery system comply with NDMP. NDMP supports interaction between the DMA that a user uses to interface with the content addressed storage system, the backup and recovery software module (BRM) that manages or resides within the host NDMP server associated with the CAS system, and the secondary backup storage system.

NDMP supports data transfer in two formats: single stream and multiple stream. In single stream format, data objects are transmitted one at a time. In multiple stream format, data objects are transmitted simultaneously. The number of data streams may depend upon the limitations of the hardware and software configuration, the limitations of the network, and the limitations of the ultimate destination where data objects are streamed.

One process for streaming data objects selected for archiving to a secondary storage device, such as a tape, requires that data objects be packaged according to a certain byte size. One skilled in the relevant art will recognize that such packaging will involve copying or moving the data objects into memory buffers, or blocks, before streaming them to the secondary storage device. If a data object exceeds the size of the data block buffer, then the data object may be divided up before being streamed to the secondary storage device. As a result, the data object may be fragmented or non-sequentially placed in multiple locations on the secondary storage device. In the case of a tape, a large data object will be apportioned across multiple sections of tape. While this method may be efficient for some older backup and archiving purposes, it proves inefficient for data object restoration operations.

Because large data objects may be divided across multiple locations on the secondary storage device medium, the restoration process is delayed by the task of locating each portion of the fragmented file. The chance of data loss is therefore increased because of the system's inability to locate all the fragmented pieces. Additionally, restoration is slowed by the necessary step of making sure all the fragmented pieces correctly correspond. In many systems, recovery often fails since the system is unable to locate all of the fragmented pieces of a data object. Large recovery requests for multiple data objects compounds the problem, resulting in mass data recovery failure and defeating the purpose of having a viable backup, recovery and archive system.

What is needed is a novel process for archiving data objects stored in a content addressed storage system that avoids recovery failure and/or recovery delay. What is needed is a process that will reduce the inefficiency of restoring fragmented data objects. What is further needed is a process that works with existing NDMP-compatible content addressed storage systems that is easy to adopt and implement.

BRIEF DESCRIPTION OF THE FIGURES

FIG. 6(*a*) is an exemplary block diagram of a data object being backed up to tape, according to one embodiment of the present invention.

FIG. 6(*b*) is an exemplary block diagram of a data object being backed up to tape where the data object is the same size as the tape segment to which the data object will be written, according to one embodiment of the present invention.

FIG. 6(*c*) is an exemplary block diagram of a data object being backed up to tape where the data object is smaller than the tape segment to which the data object will be written, according to one embodiment of the present invention.

FIG. 6(*d*) is an exemplary block diagram of a data object being backed up to tape where the data object is larger than a single tape segment, according to one embodiment of the present invention.

FIG. 7(*a*) is an exemplary block diagram of a data object being restored from tape, according to one embodiment of the present invention.

FIG. 7(*b*) is an exemplary block diagram of a data object being restored from tape where the data object is the same size as the tape segment on which the data object was written, according to one embodiment of the present invention.

FIG. 7(*c*) is an exemplary block diagram of a data object being restored from tape where the data object is smaller than the tape segment on which the data object was written, according to one embodiment of the present invention.

FIG. 7(*d*) is an exemplary block diagram of a data object being restored from tape where the data object is larger than a single tape segment on which the data object was written, according to one embodiment of the present invention.

DETAILED DESCRIPTION OF THE INVENTION

A process and system for contiguously transferring, or streaming, data objects to and from a secondary storage system is disclosed. In addition, a process and system for recording non-fragmented data objects to the secondary storage medium is disclosed. An embodiment of the present invention works with CAS systems used to archive data objects (also known as binary large objects, blobs or files) onto a secondary storage medium, like tape. By adding the functionality described herein, existing content addressed storage systems can be made more efficient during backup and recovery operations, and can reduce the frequency of recovery failures.

Organizations will typically adopt a content addressed storage system because of its inherent ability to store large quantities of data in a fixed form. Data objects themselves are stored in a single flat directory within the CAS system repository, organized by the system using each data object's content. Data objects are each associated with metadata files that contain information about its respective data object. The metadata file may contain the original user-defined name for the data object, the time the data object was created or last modified, the project that the data object corresponds to, or even the location of the data object within the CAS system repository. The data object may be recalled by referring to pointers within the metadata file that help locate the data object within the CAS system repository.

CAS systems may serve as an organization's primary backup system. To supplement the primary CAS system, an organization may employ a secondary storage system, such as a tape archive. One process for transferring CAS data objects to tape involves queuing up a list of data objects for archive, storing the listed data objects in a memory buffer, then transferring the data objects to tape. As will be discussed, one embodiment of the present invention enables existing CAS systems to transfer data objects to tape without causing data objects to be fragmented across the storage medium. The present invention does not tax present systems with difficult computing processes, but adds a functionality to increase backup and archive efficiency while reducing recovery failure.

Figure 1:
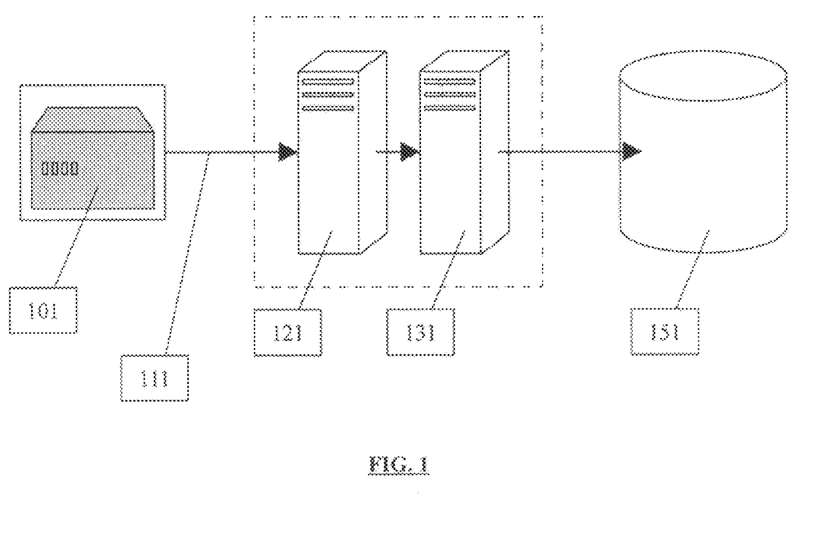
FIG. 1 is an exemplary block diagram of the various hardware and software components for implementing an embodiment of the present invention.
Figure 2:
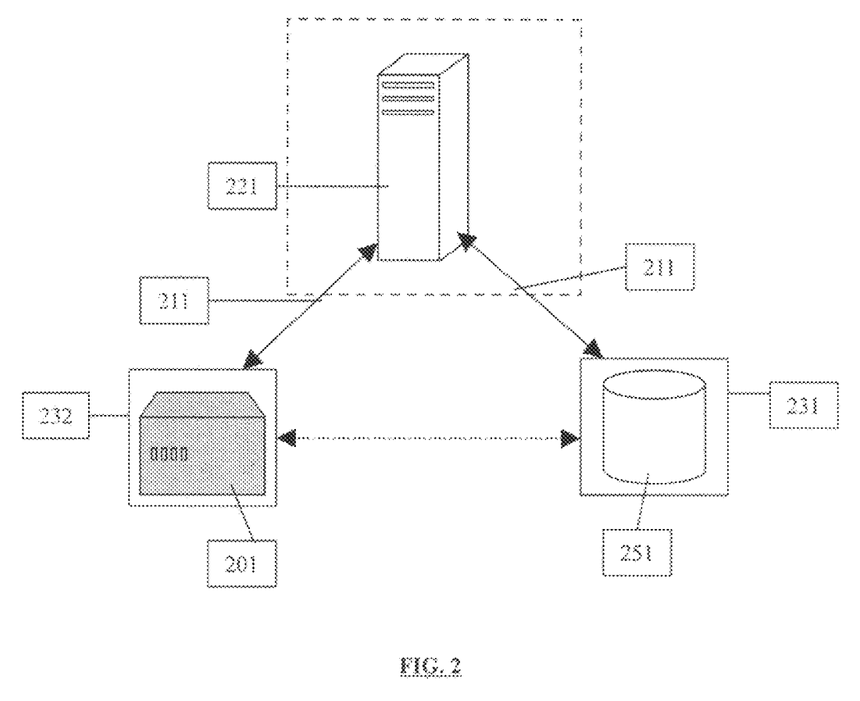
FIG. 2 is another exemplary block diagram of the various hardware and software components for implementing another embodiment of the present invention.

FIGS. 1 and 2 illustrate the hardware components that are common for the different embodiments of the present invention. FIG. 1 illustrates the four basic components of a system utilizing an embodiment of the present invention. These include a data source 101, a DMA 121, a host server 131 and a data destination or storage device 151. One skilled in the relevant art will appreciate that the components shown are merely block representations of an embodiment of a basic CAS system, and that many systems are available that have more components than those illustrated.

Data source 101 can be a standalone computer or a computer that is part of a distributed server system, so long as it can access the other basic components of the CAS system over a network. Data source 101 can also be the storage device to another CAS system or similar network-accessible storage device. One skilled in the art will recognize that the terms "network," "computer network," and "online" may be used interchangeably and do not imply a particular network embodiment or topography. In general, any type of network (e.g., LAN, WAN, SAN or Internet) may be used to implement the online or computer networked embodiment of the present invention. The network may be maintained by a server, or the network may be serverless. Similarly, any type of protocol (e.g., HTTP, FTP, ICMP, UDP, WAP, SIP, H.323, NDMP, TCP/IP) may be used to communicate across the network.

In one embodiment, data source 101 contains the data objects that a user or administrator wishes to archive. Data source 101 can also be connected to a display for showing the progress of a backup or restore to the CAS system. According to one embodiment, data source 101 will also display the graphical user interface of the catalog feature of the present invention. Data source 101 is connected via network 111 to a data mover agent, shown as DMA 121 in FIG. 1. In one embodiment, DMA 121 is a backup utility software application that performs the physical operations of the CAS system, that is, sending commands and instructions to the host server computer 131 to initiate backup or recovery operations. In another embodiment, DMA 121 also provides the graphical user interface that displays the catalog aspects of the present invention. While depicted as a physical component in FIG. 1, one skilled in the relevant art will recognize that DMA 121 is a software application that can either reside within host server computer 131 or operate outside of host server computer 131, and that similarly, host server computer 131 can be a physical server or a virtual server.

Host server computer 131, which communicates with DMA 121 over network 111, contains the backup and recovery software module (BRM) that accepts the instructions and/or commands from DMA 121. In one embodiment, DMA 121 communicates and transports data through the BRM of host server 131 using Network Data Management Protocol (NDMP). Host server 131 is NDMP compatible. One skilled in the relevant art will recognize that the NDMP protocol is a well-known protocol adopted in the backup device industry that standardizes some of the syntax and commands between backup hardware and software products. One embodiment of the present invention also contemplates that the software aspect for enabling the transfer of data objects from data source 101 is managed by the BRM of host server 131. Another embodiment envisions that the computer software code that enables the streaming feature of the present invention resides within the BRM of host server 131.

According to one embodiment, DMA 121 interacts with host server 131 over network 111. In another embodiment, DMA 121 resides within host server 131 so that the BRM interacts directly with DMA 121. DMA 121 enables the movement of data assets to storage device 151, whether it be a CAS storage server, a tape server storage device, or some other NDMP-based network-attached storage device.

The present invention is not limited to any specific combination of hardware circuitry and software, nor to any particular source for the instructions executed by the server or data sources. For example, in another embodiment, DMA may enable archive operations between primary and secondary backup devices. In FIG. 2, DMA 221 communicates over network 211 to a primary backup 201. Communication between DMA 221 and primary backup 201 is enabled by an NDMP compatible host server 232. Additionally, DMA 221 interacts over network 211 with a secondary backup 251. Communication between DMA 221 and secondary backup 251 is enabled by a second NDMP compatible host server 231. In this embodiment, the user accesses DMA 221 to initiate archiving of data objects on primary backup 201 to secondary backup 251. DMA 221 will bridge communications between primary host server 232 and secondary host server 231, and data objects will be streamed from primary backup 201 to secondary backup 251 without requiring that DMA 221 handle the actual data objects. According to this embodiment, DMA 221 will still enable contiguous data streaming to secondary storage device 251, and will still write data-objects in a non-fragmented and/or sequential manner onto the secondary storage device 251 media.

One embodiment of the present invention relates to the streaming of data objects from a CAS storage system 101, as managed by the BRM within host NDMP server 131, to tape 151. Within the BRM, specific software modules may be necessary to implement the backup embodiment of the present invention. During a backup of a CAS storage system to tape, one embodiment of the present invention utilizes a generator module, a reader module and a writer module. In addition, an embodiment of the present invention utilizes two types of memory buffers. The first, termed a "data block buffer," receives and temporarily stores data objects streamed from the CAS system repository. The second, termed a "tape block buffer," receives, temporarily stores and subsequently transfers the data objects to the tape media. An embodiment of the present invention permits multiple streams of data to data block buffers, but funnels the data streams to a single stream before transfer to the tape block buffer.

The Backup Process

Figure 3:
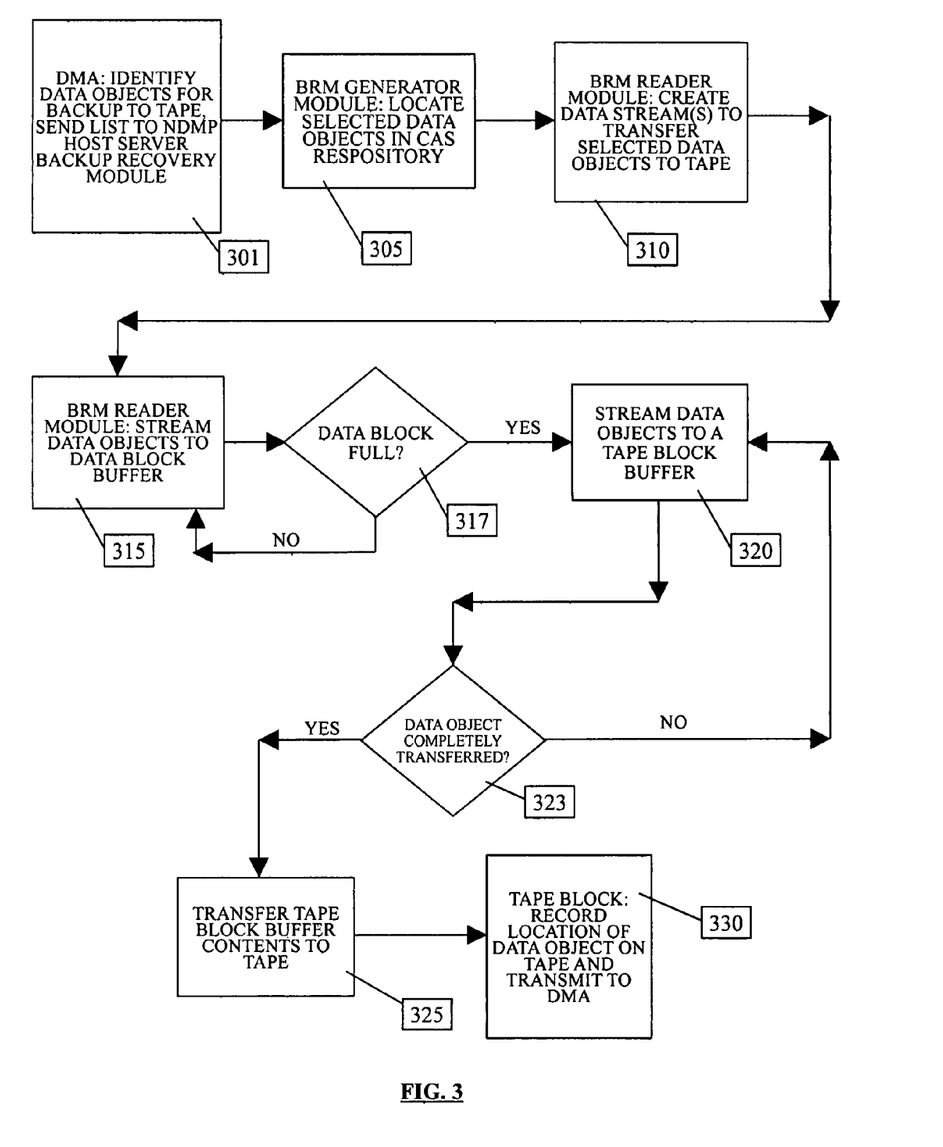
FIG. 3 is an exemplary flowchart illustrating the steps followed during a backup procedure, according to one embodiment of the present invention.

FIG. 3 is a flowchart describing the steps to implement a backup embodiment of the present invention. In a first step 301, the user uses the DMA to select data objects for backup from CAS system to tape. Data objects may be selected by name, by project, by date or by location. One skilled in the relevant art will appreciate that there are a number of different criteria that a user can apply. Alternatively, the CAS system may be configured to backup to tape at certain time intervals or at the triggering of another event. No matter how the data objects are selected, a list is generated and passed from DMA to host NDMP server 131, within which the BRM resides.

The BRM may contain a number of modules, according to one embodiment of the present invention. A generator module accepts the list from the DMA or CAS system, depending upon how the list is generated, and locates the data objects within the CAS repository (step 305 of FIG. 3). This is accomplished by parsing the metadata associated with each data object and using the information that corresponds with the data object's location. This information is used to gather the data objects for streaming.

The actual streaming step 310 is performed by a reader module, which reads each data object and streams them to data block buffers. As noted previously, there can be multiple streams and multiple data block buffers, but each buffer has a maximum size, measured in bytes. The ability to transfer multiple streams of data simultaneously is a feature available on some CAS systems; however, an embodiment of the present invention functions equally well for those CAS systems that support only a single stream transfer of data. A stream can constitute of a queue of data block memory buffers, which can vary in number but may hold sixteen data blocks. In one embodiment of the present invention, data objects will eventually be transferred to a tape having sectors of around 200 MB. Thus, the data block memory buffers will each be 200 MB as well, thus ensuring that data objects are transferred in sizes that correlate to the media that they are stored upon. One will appreciate that the number and byte size of the data block buffers can vary.

Figure 4:
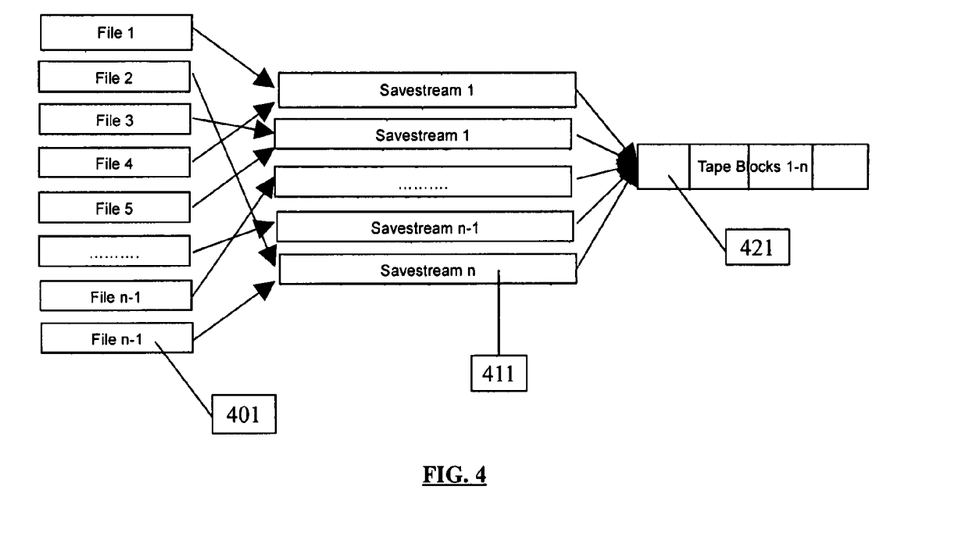
FIG. 4 is an exemplary block diagram of data objects, data streams and a tape block buffer, according to one embodiment of the present invention.

FIG. 4 illustrates an embodiment where a plurality of data objects 401 are transferred to multiple streams of data block buffers 411, then funneled to a single stream of data objects stored in a tape block memory buffer 421. According to one embodiment of the present invention, the segments shown in tape block 421 are each 200 MB divisions. FIG. 4 is a block diagram that visually depicts multiple data streams that are eventually reduced in number to a single data stream, helping sequentially transfer data objects to tape.

Returning to the flowchart in FIG. 3, the reader module of step 310 creates the number of streams to transmit data objects to data block buffers. This number can be configured by the user, or be automatically calculated by the BRM. One will appreciate that the more streams that are created, the more the system will be tasked by the backup process. According to one embodiment of the present invention, each stream may also be identified by metadata created by the reader module. Such metadata may include an alphanumeric identifier for the stream, the data block buffer size, and/or the table of contents for the data object or data objects within the stream. If a data object occupies more than one data block, or even more than one stream, then the associated metadata for the stream will inform the beginning and the end of the streamed data object.

In step 315 of FIG. 3, selected data objects are streamed and packaged onto at least one data stream, and transferred to the data block buffer. A data block buffer can only hold a certain amount of data, so if a data block becomes full, it then streams its contents to the tape block buffer (step 320 of FIG. 3). A data block buffer will continue to accept data objects until it is full and ready to transfer (step 317 of FIG. 3). One will appreciate that in a multiple stream system, this event occurs simultaneously within each data block buffer within each stream.

Once the tape storage device is ready to receive data objects, in step 320 of FIG. 3, it will be able to accept data objects from the tape block buffer. One will appreciate that, in one embodiment of the present invention, the tape block buffer will be of a byte size equal to a segment on the tape storage media where a data object will be written. Data objects from each of the multiple streams are queued up in the tape block memory buffer. FIG. 4 depicts an embodiment where there is only one stream to the tape device, consisting of a set number of tape blocks 421, whereas there can be multiple streams of multiple data blocks 411. This convention ensures that data objects are sent to tape one at a time, which further ensures that data objects are contiguously written to tape. If a data object takes up more than one data block, then one embodiment of the present invention will prohibit all other data block transfers to the tape block buffer until that data block has been streamed to tape. An embodiment causes the system to read the data object, note its size and content, and determine whether a data object has been completely transferred to the tape block buffer (323 of FIG. 3). In one embodiment of the present invention, a backup thread module continuously searches the system for full tape block streams, and once one is encountered, the backup thread module writes the tape block contents to tape (325 of FIG. 3). Once a data object has been written to tape, in step 330, the location of the data object on the tape is recorded and transmitted to the DMA, along with the metadata for the stream. In a preferred embodiment, all of the metadata and data object locations are transmitted to the DMA as a file history file after all data objects have been backed up to tape from the CAS system. In an alternative embodiment, this information is passed to the DMA after each data object is backed up. In either embodiment, the location of the data objects on the tape must be transmitted to enable the restoration embodiment of the present invention.

Figure 6A:
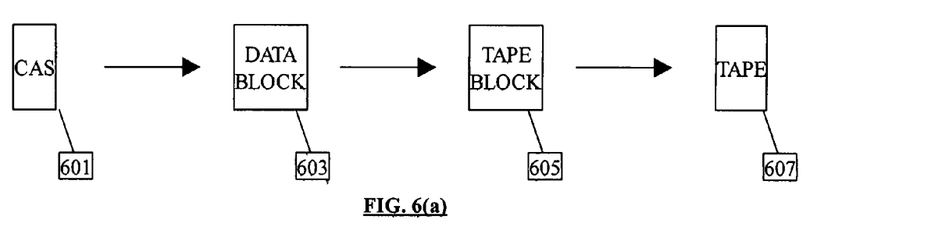
Figure 6B:
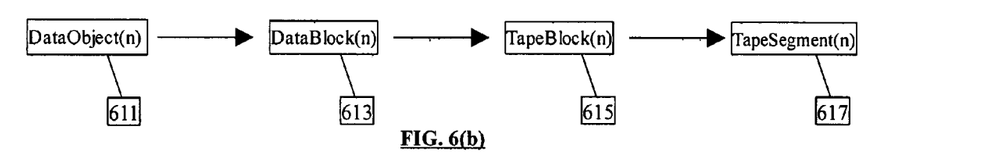

According to one embodiment of the present invention, the result of the disclosed backup process is that data objects are written in a non-fragmented form. FIG. 6 illustrates this embodiment. In FIG. 6(a), a data object stored in CAS system 601 is transferred to data block buffer 603, then to tape block buffer 605, then finally to a segment on tape 607. If the data object is the same size as the segment to which it will be saved, then the archive process will flow as shown in FIG. 6(b). DataObject(n) 611 will be the same byte size as the buffer DataBlock(n) 613, which will transfer DataObject(n) 611 to TapeBlock(n) 615 as a complete data object, and when resources are available, an embodiment of the present invention will write DataObject(n) 611 to TapeSegment(n) 617.

Figure 6C:
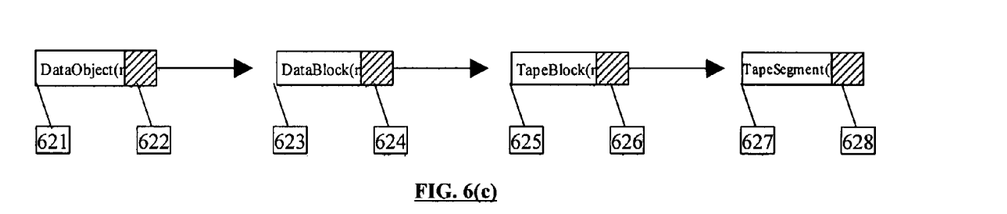

If a data object is smaller than the size of the tape segment to which it will be written, then in one embodiment of the present invention, there will be available space in the corresponding buffers that will either be left empty, or will be available to accept a next data object. In FIG. 6(c), DataObject(n) 621 is smaller than the tape segment to which it will be written, represented in the CAS system as the shaded portion 622. In one embodiment, this shaded portion 622 may be empty, or may contain a next DataObject(n+1).

When DataObject(n) 621 is selected for backup to tape, an embodiment of the present invention will cause DataObject (n) 621 to be transferred to a data block buffer, such as DataBlock(n) 623. Since DataObject(n) 621 is smaller than the size of the tape segment to which it will be written, then, according to one embodiment, DataObject(n) 621 will also be smaller than the data block buffer that temporarily stores it during the backup process. As shown in FIG. 6(c), DataObject(n) 621 takes up a portion of a data block buffer as DataBlock(n) 623, with the remainder 624 open to accept a next data object. DataObject(n) 621 will then be streamed to a tape block, shown as TapeBlock(n) 625. In one embodiment, a portion of the tape block buffer may remain free to accept a next data object, illustrated as shaded portion 626. When DataObject(n) 621 is written to tape, it will occupy a portion of a tape segment shown as TapeSegment(n) 627. In one embodiment of the present invention, a portion of the tape segment will remain free to accept another data object selected for backup, depicted as shaded portion 628.

Figure 6D:
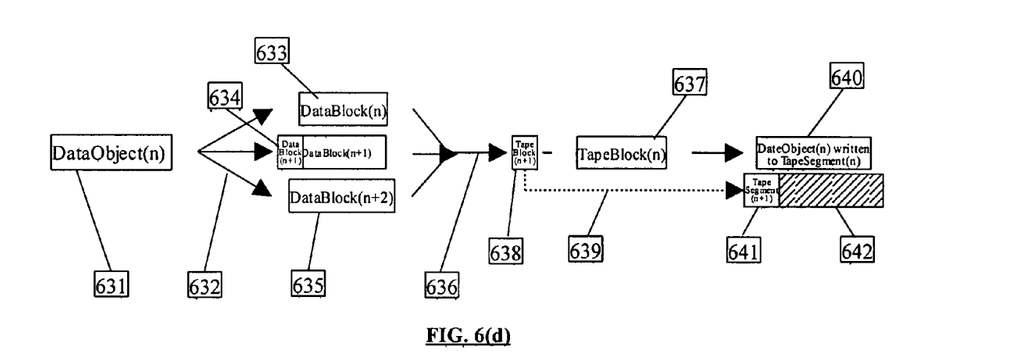

A data object selected for backup may be larger than a single tape segment on the tape medium. For example, a tape segment may hold 200 MB, but a data object selected for archive to tape may be 250 MB. An embodiment of the present invention compensates by dividing up the data object during transfer, then writing the divided data object to sequential tape segments. In FIG. 6(d), DataObject(n) 631 is larger than a single tape segment. When DataObject(n) 631 is selected for backup to tape, an embodiment of the present invention divides up DataObject(n) 631 and streams the pieces to the data block buffers. One embodiment permits many data objects to be transferred to data block buffers simultaneously, shown as multiple streams 632. In another embodiment, stream 632 is a single stream such that data objects selected for backup to tape are transferred to data block buffers one at a time.

In one embodiment of the present invention, a data block buffer may be smaller than the selected data object. In FIG. 6(d), DataObject(n) 631 is divided up and transferred to a first DataBlock(n) 633. Overflow data which does not fit within the memory size constraints of DataBlock(n) 633 may be moved to second DataBlock(n+1) 634. This may leave the second data block with available memory to accept a second data object selected for backup. DataBlock(n+2) 635 illustrates an embodiment of the present invention where many data objects can be selected for backup to tape, so long as data block buffers are available.

While data objects can be simultaneously streamed to data block buffers, an embodiment of the present invention limits transfer to tape block buffers to a single stream so that data objects are written to tape sequentially and one at a time. In FIG. 6(d), DataBlock(n) 633, DataBlock(n+1) 634 and DataBlock(n+2) 635 are transferred over a single stream 636 to tape blocks. In one embodiment, the contents of DataBlock (n) 633 and DataBlock(n+1) 634 are transferred to TapeBlock (n) 637 and TapeBlock(n+1) 638, respectively. In one embodiment of the present invention, a backup thread module continuously searches the system for full tape block streams such as TapeBlock (n) 637. The backup thread module may then transfer the full tape block to tape. If a data object occupies more than one tape block, as is shown in TapeBlock (n) 639 and TapeBlock(n+1) 638, an embodiment of the present invention will not permit the transfer to be interrupted by another data object until the first data object is completely written to tape.

FIG. 6(d) depicts one embodiment where DataObject(n) is written to a first TapeSegment(n) 640, then overflow data is written in a second stream 639 to TapeSegment(n+1) 641. In one embodiment, TapeSegment(n+1) 641 is the next segment adjacent to TapeSegment(n) 640. Any following data object selected for archive may be written to any remaining portion of TapeSegment(n+1) 642. As a result, in one embodiment of the present invention, DataObject(n) 631 is written to TapeSegment(n) 640 and sequential TapeSegment(n+1) 641. In this embodiment, there is no intervening data from other data objects. The location of DataObject(n) 631 on the tape media may be saved in metadata that is then sent to the DMA, which may be useful during if DataObject(n) 631 needs to be restored from tape.

The Restore Process

Once a backup of data objects from a CAS system has been completed using the process described above, the tape storage device will have all of the selected data objects written to the tape media. A user wishing to restore backed up data objects will, in one embodiment, issue the appropriate command using the DMA (step 501 of FIG. 5). Data objects can be individually selected for restoration, or instructions for restoration of all data objects created, modified or even backed up during a certain time period can be issued. One skilled in the relevant art will appreciate that there are a number of paradigms that can be applied to recover certain sets of backed up data objects. One will also appreciate that data objects do not necessarily have to be restored back to the CAS system that they originated from, but can be restored to any NDMP-compatible system capable of accessing and interacting with the hardware components of the present invention.

Figure 5:
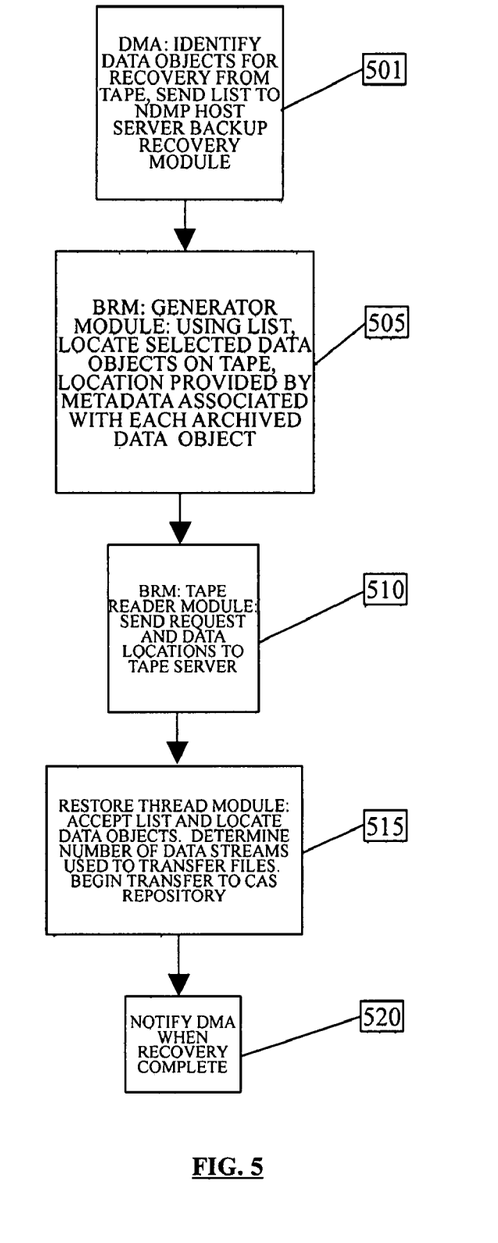
FIG. 5 is an exemplary flowchart illustrating the steps followed during a recovery procedure, according to one embodiment of the present invention.

Similar to the backup process described previously, a list of data objects selected for restoration will be passed from the DMA to the BRM within the host NDMP server (501 of FIG. 5). A generator module will take the list and will locate the metadata associated with each data object (505 of FIG. 5). The metadata will include the location on the tape media of each selected data object. This information will have been passed to the DMA during backup of the data objects from the CAS system to tape. Once the generator module has a list of data objects and their locations on the tape, it transmits this information to the tape storage device server (step 510 of FIG. 5).

One embodiment of the present invention incorporates a restore thread module that looks for lists of data objects to restore from tape. In one embodiment, the restore thread module is part of the BRM. In another embodiment, the restore thread module is part of the tape storage device server software. In either embodiment, the restore thread module takes the list of data objects to restore and their respective locations, and determines the number of streams to set up for restoring the data objects to the CAS system (step 515 of FIG. 5). The number of restore streams can vary, but can be no more than the number of streams used to back up the data objects.

Concurrently, the tape device is searched for the desired data objects. Each segment on the tape media will have associated metadata that discloses the data contents within each segment. If there is a match between the data object on the tape, and the data object identified for restoration, then that data object is selected for transfer to a tape block buffer. This tape block buffer may be of a certain byte size determined by the segment size on the storage media. In one embodiment, the tape block memory buffer is 200 MB.

Once a data object is located and streamed to the tape block buffer, a writer module takes the stored the data object and writes it to the CAS system repository. Once all data objects have been restored, the DMA is notified (520 of FIG. 5). The user will then know when restoration has completed.

Figure 7A:
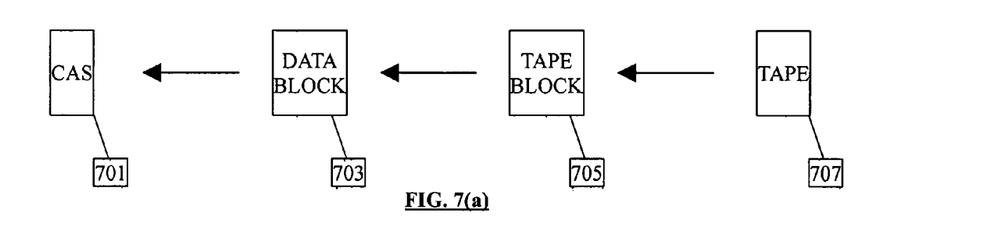
Figure 7B:
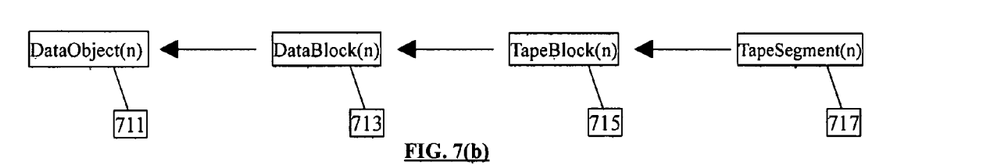

In one embodiment, data objects backed up in a contiguous manner are restored using a reverse of the backup process. As illustrated in FIG. 7(*a*), data objects written to Tape 707 and selected for recovery are transferred to a Tape Block 705, then to a Data Block 703 before being reproduced on the CAS system 701. Because data objects were written sequentially on the tape media, the failure rate for recoveries is lowered. The location of the data object selected for recovery will be known to the DMA, since in one embodiment, metadata associated with the selected data object will contain this information. In one embodiment as illustrated in FIG. 7(*b*), a selected data object may have been written to TapeSegment(n) 717. The data object will be transferred to a TapeBlock(n) 715. Once the data object has been completely copied to TapeBlock(n) 715, it will be streamed to a data block buffer DataBlock(n) 713. This transfer may be over a single stream or a multiple stream. After the data object has been completely copied to DataBlock(n) 713, it may be copied to the CAS system as DataObject(n) 711. One will appreciate that one data object, or a plurality of data objects may be selected for recovery.

A CAS system 701 that implements the present invention will be able to recover data objects without having to tax the system by looking for each piece of a data object. While previously, fragmented backups to tape were an efficient means to store data assets while reducing load on the system, the unfortunate consequence is that recoveries of the stored data assets are often difficult for computing resources. One skilled in the relevant art will appreciate the benefit of storing data objects together, rather than broken up across the tape media.

Figure 7C:
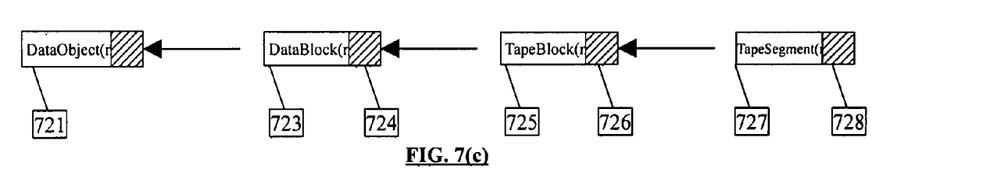

In another embodiment of the present invention, the data object selected for recovery may be written to a tape segment larger than the actual data object. FIG. 7(*c*) illustrates how a selected data object may be written to a TapeSegment(n) 727, with a remaining portion of the tape segment 728 containing a next data object that has been previously backed up to tape. In another embodiment, tape segment 728 may be empty.

When the data object backed up in TapeSegment(n) 727 has been transferred to a tape block like TapeBlock(n) 725, it will occupy a portion of the buffer, leaving a remainder 726 available for another data object selected for recovery, or in another embodiment, left empty. Further, in one embodiment, the data object selected for recovery will be streamed from TapeBlock(n) 725 to DataBlock(n) 723. A remainder 724 of the data block buffer will remain empty, or in another embodiment, may contain a portion or all of the next data object selected for recovery.

In one embodiment of the present invention, a restore thread module continuously monitors the system for data objects selected for recovery in the data block buffers. In FIG. 7(*c*), the restore thread module finds the contents of DataBlock(n) 723 and streams the contents to the CAS system repository as DataObject(n) 721.

Figure 7D:
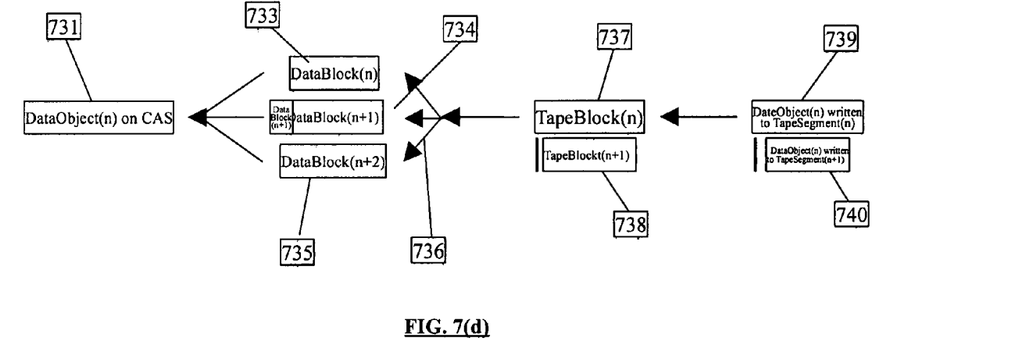

In one embodiment, a data object selected for recovery may be of a size such that it occupies more than one tape segment on the tape media. Because the data object will have been written in a manner that it occupies sequential tape segments, the system will not have to search across a plurality of random tape segments. In FIG. 7(*d*), a portion of the data object selected for recovery resides on TapeSegment(n) 739 and sequential TapeSegment(n+1) 740.

Once the system has located the data object selected for recovery, it will be transferred to a tape block buffer. In this embodiment, the data object is large enough to occupy two tape block buffers, TapeBlock(n) 737 and TapeBlock(n+1) 738. TapeBlock(n) 737 will then transfer its contents to a first DataBlock(n) 733 buffer, and any remaining data will be then be transferred to a second DataBlock(n+1) 734 buffer. FIG. 7(*d*) additionally illustrates that more than one data object can be recovered from tape, and additional data objects can be transferred to other tape block and data block buffers as memory resources permit. DataBlock(n+2) 735 may contain a next selected data object recovered from tape.

Once the restore thread module determines that the selected data object has been completely copied to the DataBlock(n) 733 and DataBlock(n+1) 734 memory buffers, then in one embodiment, it will be transferred as DataObject(n) 731 in the CAS repository.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, the present invention is disclosed with reference to backup and recovery between a CAS system and a tape device. One will recognize that the process for contiguous streaming and writing of data objects, the their subsequent recover, will work between a number of primary and secondary backup storage systems.

What is claimed is:

1. A method for transferring and writing a data object from a content addressed storage (CAS) system to a tape storage device, the method comprising:

providing at least one data object for transfer from the content addressed storage system to the tape storage device;

transferring at least a portion of the data object into a data block memory buffer;

transferring the contents of the data block memory buffer to a tape block memory buffer when the data block memory buffer is full;

monitoring the tape block memory buffer to determine when the tape block memory buffer is full; and writing the contents of the tape block memory buffer to the tape device when the tape block memory buffer is full so that the data object is not fragmented by a second data object.

2. The method of claim 1, further comprising saving the location of the data object on the tape device in a metadata file.

3. The method of claim 1, further comprising transferring a second portion of the data object into a second data block memory buffer.

4. A method for restoring at least one data object that has been written to a tape device from a CAS system, wherein the CAS system stores data objects in a flat directory organized by content and associates metadata with each data object including the location of each data object on the tape device, the method comprising:

providing at least one data object for transfer from the tape device, the at least one data object previously written to the tape device from the CAS system;

retrieving the location of the at least one data object on the tape device from the metadata associated with the at least one data object;

retrieving at least a portion of the at least one data object at the location and transferring it into a tape block memory buffer;

transferring the contents of the tape block memory buffer to a data block memory buffer; and transferring the contents of the data block memory buffer to the CAS system.

5. The method of claim 4, further comprising transferring a second portion of the data object into a second tape block memory buffer.

6. A data storage system comprising:

a CAS system having at least one data object in storage;

a tape device; and a host server computer having a generator module for providing at least one data object for transfer to the tape device, a reader module for transferring the data object to a data block memory buffer and, when the data block memory buffer is full, transferring the contents of the data block memory buffer to the tape block memory buffer, and a backup thread module for monitoring a tape block memory buffer to determine when the tape block memory buffer is full, transferring the data object from the tape block memory buffer when the tape block memory buffer is full and writing the data object to the tape device.

7. The system of claim 6, wherein the generator module and reader module reside in a backup and recovery module associated with the host server.

8. A computer program product, comprising a non-transitory computer readable medium having computer readable code embodied therein, the computer readable code adapted to be executed by one or more processors to implement a method for transferring and writing a data object from a content addressed storage (CAS) system to a tape storage device, the method comprising:

providing at least one data object for transfer from the content addressed storage system to the tape storage device;

transferring at least a portion of the data object into a data block memory buffer;

transferring the contents of the data block memory buffer to a tape block memory buffer when the data block memory buffer is full;

monitoring the tape block memory buffer to determine when the tape block memory buffer is full; and writing the contents of the tape block memory buffer to the tape device when the tape block memory buffer is full so that the data object is not fragmented by a second data object.

9. The computer program product of claim 8, further comprising saving the location of the data object on the tape device in a metadata file.

10. The computer program product of claim 8, further comprising transferring a second portion of the data object into a second data block memory buffer.

11. The method of claim 1, further comprising configuring the data block memory buffers to correspond in size to the tape storage device.

12. The method of claim 1, wherein one or more data objects are transferred contiguously into a single data block memory buffer.

13. The method of claim 1, wherein each of a plurality of data objects is transferred via multiple streams into respective data block buffers, and wherein streams from the respective data block buffers are organized into a single stream prior to transferring the contents to the tape block memory buffer.

14. The method of claim 1, wherein for a large data object requiring two or more data block memory buffers to hold the large data object, all transfers of other data block memory buffers are prohibited until the data block memory buffers for the large data object have been transferred to the tape block memory buffer.

15. A method for transferring and writing a data object from a content addressed storage (CAS) system to a tape storage device, the method comprising:

identifying a plurality of data objects for transfer from the content addressed storage system to the tape storage;

transferring each data object into one or more data block memory buffers;

transferring the contents of each data block memory buffer to a tape block memory buffer when each data block memory buffer is full;

monitoring the tape block memory buffer to determine when the tape block memory buffer is full; and writing the contents of the tape block memory buffer to the tape device when the tape block memory buffer is full.

16. A computer program product, comprising a non-transitory computer readable medium having computer readable code embodied therein, the computer readable code adapted to be executed by one or more processors to implement a method for transferring and writing a data object from a content addressed storage (CAS) system to a tape storage device, the method comprising:

identifying a plurality of data objects for transfer from the content addressed storage system to the tape storage;

transferring each data object into one or more data block memory buffers;

transferring the contents of each data block memory buffer to a tape block memory buffer when each data block memory buffer is full;

monitoring the tape block memory buffer to determine when the tape block memory buffer is full; and writing the contents of the tape block memory buffer to the tape device when the tape block memory buffer is full.

* * * * *